US012290839B2

(12) United States Patent
Schultheis

(10) Patent No.: US 12,290,839 B2
(45) Date of Patent: May 6, 2025

(54) VIBRATORY SCREENER

(71) Applicant: Vibra Maschinenfabrik Schultheis GmbH & Co., Offenbach (DE)

(72) Inventor: Winfried Schultheis, Offenbach (DE)

(73) Assignee: Vibra Maschinenfabrik Schultheis GmbH & Co., Offenbach (DE)

( * ) Notice: Subject to any disclaimer, the term of this patent is extended or adjusted under 35 U.S.C. 154(b) by 0 days.

(21) Appl. No.: 18/533,571

(22) Filed: Dec. 8, 2023

(65) Prior Publication Data

US 2024/0100568 A1 Mar. 28, 2024

Related U.S. Application Data

(63) Continuation of application No. PCT/EP2021/066883, filed on Jun. 22, 2021.

(51) Int. Cl.
*B07B 1/34* (2006.01)
*B07B 1/46* (2006.01)

(52) U.S. Cl.
CPC .............. *B07B 1/34* (2013.01); *B07B 1/4609* (2013.01)

(58) Field of Classification Search
CPC .. B07B 1/34; B07B 1/343; B07B 1/42; B07B 2201/02
USPC ....... 209/233, 346, 370, 372, 406, 409, 411, 209/412
See application file for complete search history.

(56) References Cited

U.S. PATENT DOCUMENTS 4,152,253 A * 5/1979 Summers ............... B01D 35/28 209/323
4,540,485 A * 9/1985 Lanerie ................ B01D 36/045 209/403
2009/0159507 A1* 6/2009 Mainwaring ............. B07B 1/38 209/412

(Continued)

FOREIGN PATENT DOCUMENTS

| | | | |
|---|---|---|---|
| CN | 108421696 | A | 8/2018 |
| EP | 3549683 | A1 | 10/2019 |
| GB | 2073054 | A | 10/1981 |

OTHER PUBLICATIONS

International Search Report and the written opinion of the International Searching Authority issued for International Patent Application No. PCT/EP2021/066883 mailed on Mar. 28, 2022.

*Primary Examiner* — Michael McCullough
*Assistant Examiner* — Molly K Devine
(74) *Attorney, Agent, or Firm* — Myers Wolin, LLC

(57) ABSTRACT

A vibratory screener includes a screen carrier frame having inner and outer circumferences, a horizontal screen for separation of solid particles within and vertically supported by the frame, one or more vibration motors on the outer circumference of the screen carrier frame and configured to generate vibration perpendicular to the screen, and at least two internal annular disks each having an inner rim and an outer rim. Each internal annular disk is attached to the inner circumference of the frame by its outer rim, the internal annular disks are spaced apart from each other in parallel planes, and an inner sleeve is arranged within the frame. The inner sleeve is attached the inner rims of two of the internal annular disks, where the upper internal annular disk and the inner sleeve provide an unbroken surface and where the lower internal annular disk has openings towards the outside environment.

20 Claims, 4 Drawing Sheets

(56) References Cited

U.S. PATENT DOCUMENTS

2019/0337018 A1* 11/2019 Tatsumoto ............ B07B 1/4663

* cited by examiner

VIBRATORY SCREENER

CROSS REFERENCE TO RELATED APPLICATIONS

This application is a continuation under 35 U.S.C. § 120 of International Application PCT/EP2021/066883, filed Jun. 22, 2021, the contents of which are incorporated by reference herein.

FIELD OF THE INVENTION

The present invention relates to a vibratory screener for use in separation of solid particles especially in applications such as pharmaceuticals and food processing. However, generally, it is also applicable in wider applications such as mineral processing, dewatering, processing of waste fluid streams, quarrying, etc.

BACKGROUND

Conventional vibratory screeners usually include a screen carrier frame carrying a screen for separation of solid particles. The screen extends horizontally within the screen carrier frame and is vertically supported by the screen carrier frame.

In one type of vibratory screener, vibration of the screen carrier frame is generated by means of typically two vibration motors which arranged opposite each other on the outer circumference of the screen carrier frame. One advantage of vibration motors is that these motors can be mounted directly on the screen carrier frame thereby avoiding any additional transmissions, gear trains, couplings and other moving machine parts that require lubrication and therefore may contaminate the environment of the apparatus with lubricants, which can become a critical issue particularly with pharmaceuticals and food processing.

Vibration motors generate vibrations through rotation of eccentric weights mounted on a rotatable shaft. By employing two counter-rotating vibrating motors it is possible to generate directed vibrations. Mounted on the screen carrier frame, the vibration motors generate not only force components in vertical direction, i.e. up and down, but also force components towards and away from each other. In particular the forces towards and away from each other act on the screen carrier frame. That is, with each rotation of the vibration motors, the radial forces tend to widen and compress the screen carrier frame radially. Such breathing may also be observed for a single vibration motor because of the inertial mass of the frame, as well as for higher numbers of vibration motors. The higher screening forces in vertical direction are required, the higher will be the forces acting radially on the screen carrier frame, which results in corresponding breathing and material fatigue of the screen carrier frame. Material fatigue may cause tiny cracks on the frame or on welds.

High stability of the screen carrier frame could be achieved by using thicker materials or hollow profiles for the screen carrier frame.

However, a heavier frame will require more powerful vibration motors for generating vertical screening forces, which in turn results in increased radial forces. In the end, this would imply an extremely heavy construction that will consume much energy under operation.

The use of hollow profiles could reduce weight but is highly problematic for hygienic reasons. During operation of a vibratory screener capillary cracks may occur that do not necessarily impair safe operation. However, germs may flourish in such tiny cracks and invade hollow spaces within the hollow profiles. Since such hollow spaces cannot be reached by disinfectants during cleaning of the apparatus, it is nearly impossible to remove germs once they have invaded such hollow spaces. In the worst case, germs like salmonellae may spread over a full production line while it will even be difficult to identify their source. In pharmaceuticals and food processing, the only option often will be discarding the whole apparatus.

Against this background, the present invention aims at scaling up materials throughput of a vibratory screener whilst providing a lightweight construction and maintaining high hygienic safety standards.

SUMMARY

This technical problem may be solved by vibratory screener comprising a screen carrier frame having an inner circumference and an outer circumference, a screen for separation of solid particles extending horizontally within the screen carrier frame and being vertically supported by the screen carrier frame, one or more vibration motors arranged on the outer circumference of the screen carrier frame and configured to generated a component of vibration in a direction perpendicular to the screen, at least two internal annular disks, each having an inner rim and an outer rim, wherein each of said at least two internal annular disks is attached to the inner circumference of the screen carrier frame by its outer rim, and wherein said at least two internal annular disks are spaced apart from each other in parallel planes, and an inner sleeve arranged within the sleeve carrier frame and attached the inner rims of to two of said at least two internal annular disks, wherein the upper internal annular disk of said two internal annular disks and the inner sleeve provide an unbroken surface whereas the lower internal annular disk of said two internal annular disks is provided with openings towards the outside environment.

This results in a lightweight structure so that the apparatus can be driven by relatively small vibration motors. The at least two internal annular disks and inner sleeve reinforce the screen carrier frame in a space between the two vibration motors to thereby reduce breathing of the screen carrier frame and also the risk of capillary crack.

In addition, the construction is free of any encapsulated hollow spaces. The creation of breeding grounds for germs is therefore reliably avoided. All surfaces of the vibratory screener can be conveniently reached for cleaning and disinfection. Openings in the lowermost internal annular disk assure that all sides of the internal annular disks and inner sleeve will be reached be cleaning detergents and disinfectants. The apparatus therefore meets highest hygienic safety standards.

Advantageous embodiments of the invention are indicated in further claims.

In a first embodiment of the invention, the screen carrier frame has a substantially cylindrical shape, thereby avoiding corners and facilitating cleaning and disinfection.

In a further embodiment of the invention, the diameter of the outer circumference of the screen carrier frame is larger than 800 mm so as to allow high throughput of product to be screened.

In yet another embodiment of the invention, the outer rims of the at least two internal annular disks are welded to the inner circumference of the screen carrier frame so as to keep the overall construction very simple.

Further, the inner sleeve may be welded to the inner rims of said two internal annular disks.

In yet another embodiment of the invention, said at least two internal annular disks include a first, second and third internal annular disk, wherein the diameter of the inner rim of the uppermost of said first, second and third internal annular disks is larger than the diameter of the inner rim of the two further internal annular disks.

In yet another embodiment of the invention, a plurality of webs extending inwardly from the inner circumference of the screen carrier frame and perpendicularly to the at least two internal annular disks, said webs being connected to the inner circumference of the screen carrier frame and at least one of said internal annular disks. This may further increase radial stiffness of the screen carrier frame.

In particular, at least two of said webs are arranged in parallel to each other at the inner circumference opposite to one vibration motor on the outer circumference to further increase the radial stiffness of the screen carrier frame especially in the direction of the radial forces generated by the vibration motors.

In yet another embodiment of the invention, each vibration motor has an axis of rotation running in a tangent plane of the outer circumference of the screen carrier frame, the tangent planes of the vibration motors being parallel to each other. By inclining the axis of rotation, it will be possible to adjust the screening forces as required.

Preferably, the axes of rotation in the tangent planes are symmetrically inclined with respect to a vertical axis of the vibratory screener.

In yet another embodiment of the invention, the vibration motors are attached to the outer circumference of the screen carrier frame by brackets, which are secured to the outer circumference of the screen carrier frame. This simplifies adjustment of the orientation of the axes of rotation of the vibration motors.

In yet another embodiment of the invention, the vibratory screener comprises a spring assembly vertically supporting the screen carrier frame against a machine base or base plate.

The vibratory screener may further comprise a hood sealingly covering the screen carrier frame. In this case, the screen is clamped between an upper rim of the screen carrier frame and a lower rim of the hood by clamping means.

Additionally, an output hopper may be clamped between the screen and the upper rim of the screen carrier frame.

BRIEF DESCRIPTION OF THE DRAWING

In the following, the invention will be described in greater detail with reference to the accompanying drawing, in which.

DETAILED DESCRIPTION OF THE PREFERRED EMBODIMENTS

Figure 1:
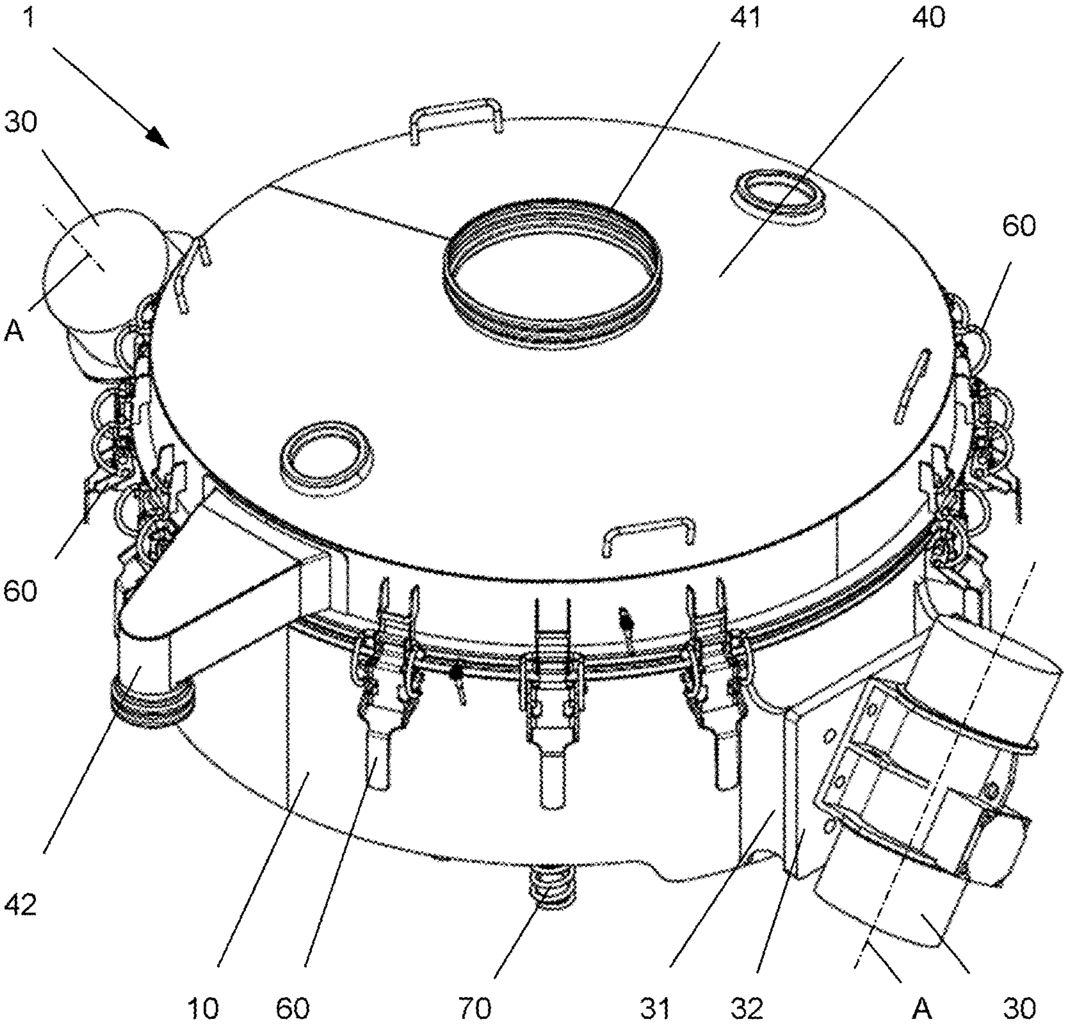
FIG. 1 is a three-dimensional view of a vibratory screener according to one possible embodiment of the present invention.

FIGS. 1 to 5 show an embodiment of a vibratory screen apparatus 1 according to the present invention.

This vibratory screen apparatus 1 comprises a screen carrier frame 10, a screen 20 for separation of solid particles, one or more vibration motors 30, a hood 40, an output hopper 50, clamping means 60, and a spring arrangement 70.

The screen carrier frame 10 may have a substantially cylindrical shape with an inner 11 circumference and an outer circumference 12. It may be made from sheet metal, preferably stainless steel, by forming a rounded sleeve and welding the ends together. However, a non-circular shape, e.g. rectangular shape of the screen carrier frame 10 may be contemplated as well.

The screen 20 for separation of solid particles is vertically supported by the screen carrier frame 10 and extends horizontally (x, y) within the screen carrier frame 10. In the embodiment shown, the screen 20 may include a wire mesh 21 mounted on an apertured support plate 22, which in turn is supported by an upper rim 13 of the screen carrier frame 10. The screen 20 is removable from the screen carrier frame 10 and secured by clamping means 60 arranged at the outer circumference 12 of the screen carrier frame 10.

In the embodiment shown, vibration forces are generated by two vibration motors 30 which are arranged opposite each other on the outer circumference 12 of the screen carrier frame 10. However, the number of vibration motors 30 may be less, implying a single vibration motor, or higher than two. The vibration motors 30 are arranged and configured to generate a component of vibration in a direction z perpendicular to the screen 20. Each of the vibration motors 30 preferably includes eccentric weights mounted on a rotatable shaft. The vibration motors 30 are operated in a counter-rotating manner to generate directed vibrations, which, apart from the vertical component in direction z, i.e. up and down, also includes a radial component in the xy-plane of the screen 20.

Figure 4:
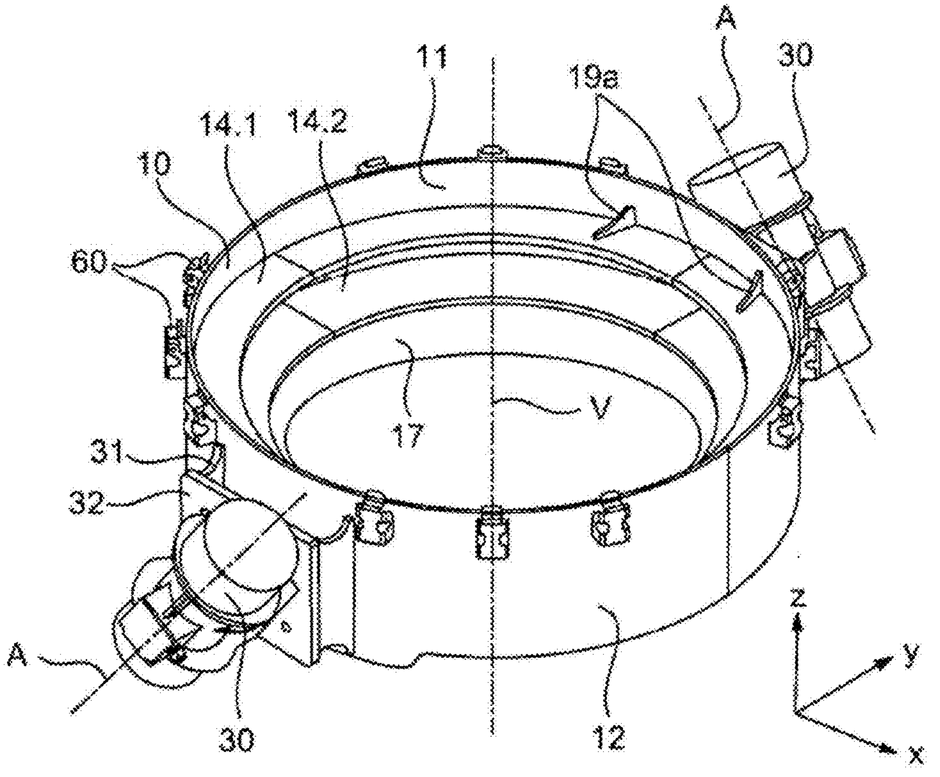
FIG. 4 is an isometric view of the screen carrier frame and vibration motors of the vibratory screener of FIG. 1.

As shown in FIG. 4, the axis of rotation A of each vibration motor 30 extends in a tangent plane of the outer circumference 12 of the screen carrier frame 10, while the tangent planes of the two vibration motors 30 are parallel to each other. By inclining the axes of rotation A of the vibration motors 30 with respect to the vertical axis V of the vibratory screener 1, it is possible to adjust the radial and vertical components of the vibration forces.

In the embodiment shown, the axes A in the tangent planes are symmetrically inclined with respect to a vertical axis V of the vibratory screener 1, so that per revolution of the vibration motors 30 the vertical components add to each other while the radial components cancel out each other.

As already mentioned, the vibration motors 30 are arranged at the outer circumference 12 of the screen carrier frame 10. They may be fitted directly to the outer circumference 12 or, as shown, by brackets 31, which are secured to the outer circumference 12 of the screen carrier frame 10, e.g. by welding. The vibration motors 30 may be screwed to the brackets 31, which each have a mounting plate 32 for the vibration motors 30. The mounting plate 32 is spaced apart from the outer circumference 12 of the screen carrier frame 10. Optionally, an adjustment mechanism may be provided between the vibration motors 30 and brackets 31 for facilitating adjustment of the rotation axes A.

In order to reduce or prevent breathing, i.e. elastic deformation, of the screen carrier fame 20 under radial force components of the vibration motors 30, the screen carrier frame 10 is provided with a particular internal reinforcement structure.

This reinforcement structure includes at least two internal annular disks. In the exemplary embodiment shown in the drawings, the reinforcement structure includes first, second and third internal annular disks 14.1, 14.2, and 14.3, each having an inner rim 15.1, 15.2, and 15.3 and an outer rim 16.1, 16.2, and 16.3, wherein each of said first, second and third internal annular disks 14.1, 14.2, and 14.3 is attached to the inner circumference 11 of the screen carrier frame 10 by its outer rim 16.1, 16.2, and 16.3, preferably through welds. These welds extend along the whole outer rim 16.1, 16.2, and 16.3 to thereby avoid any gaps between the internal annular disks 14.1, 14.2, and 14.3 and the inner circumference 11.

The first, second and third internal annular disks 14.1, 14.2, and 14.3 are spaced apart from each other in parallel planes, which are preferably horizontal planes. In the embodiment shown, the first internal annular disk 14.1 is arranged above and in parallel to the second internal annular disk 14.2 and the latter is arranged above and in parallel to the third internal annular disk 14.3.

The reinforcement structure further includes an inner sleeve 17 arranged within the screen carrier frame 10 and attached the inner rims 15.2, and 15.3 of two of said first, second and third internal annular disks, here the second and third internal annular disks 14.2 and 14.3.

The inner sleeve 17 is of substantially cylindrical shape and preferably connected to the inner rims 15.2 and 15.3 through annular welds.

Figure 2:
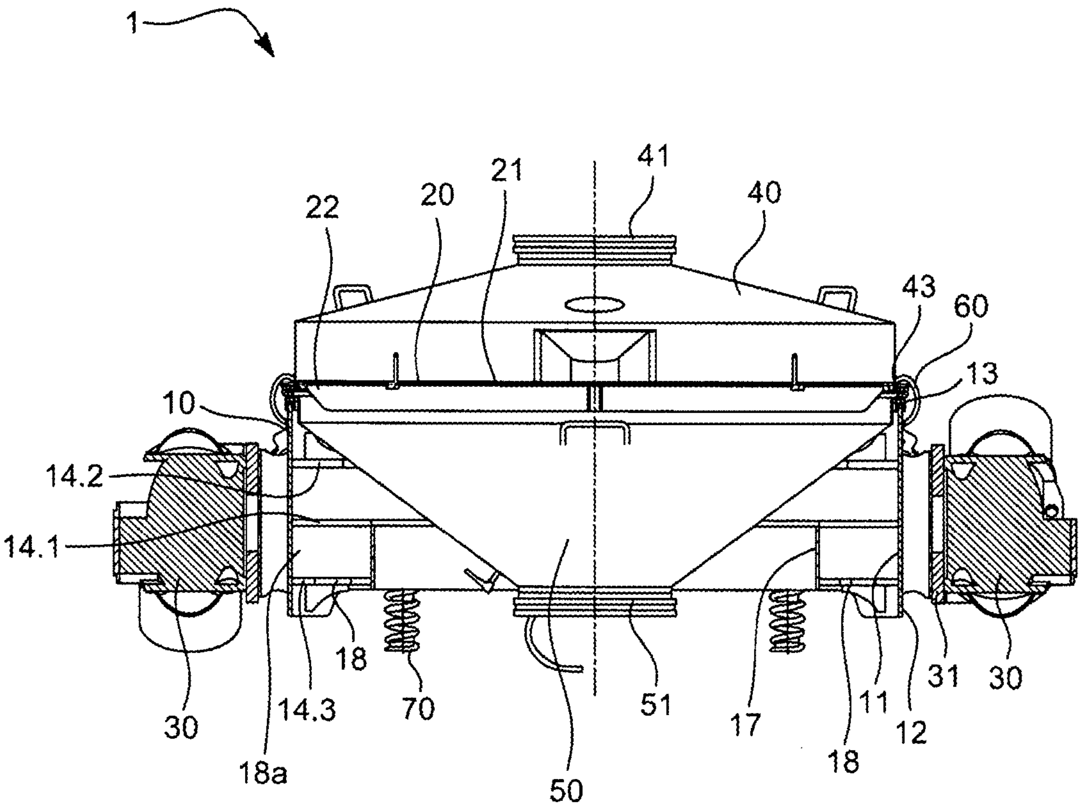
FIG. 2 is a sectional side view of a vibratory screener of FIG. 1.
Figure 3:
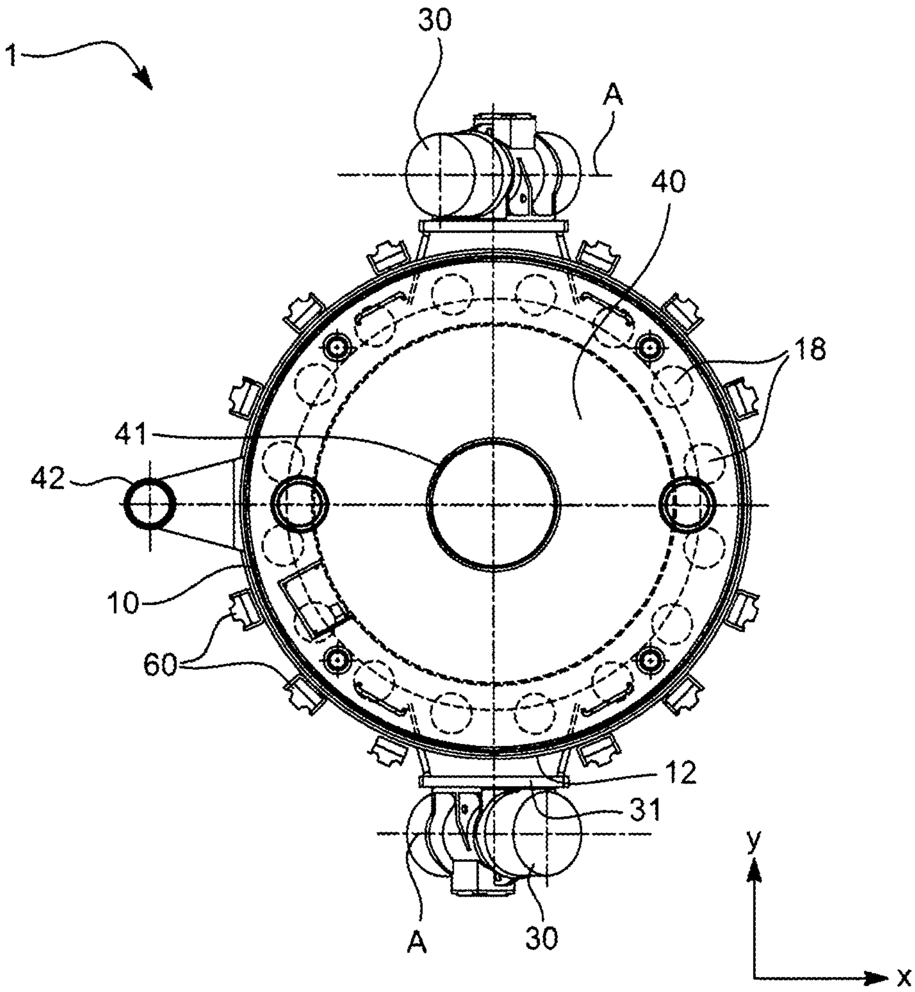
FIG. 3 is a top view of the vibratory screener of FIG. 1.
Figure 5:
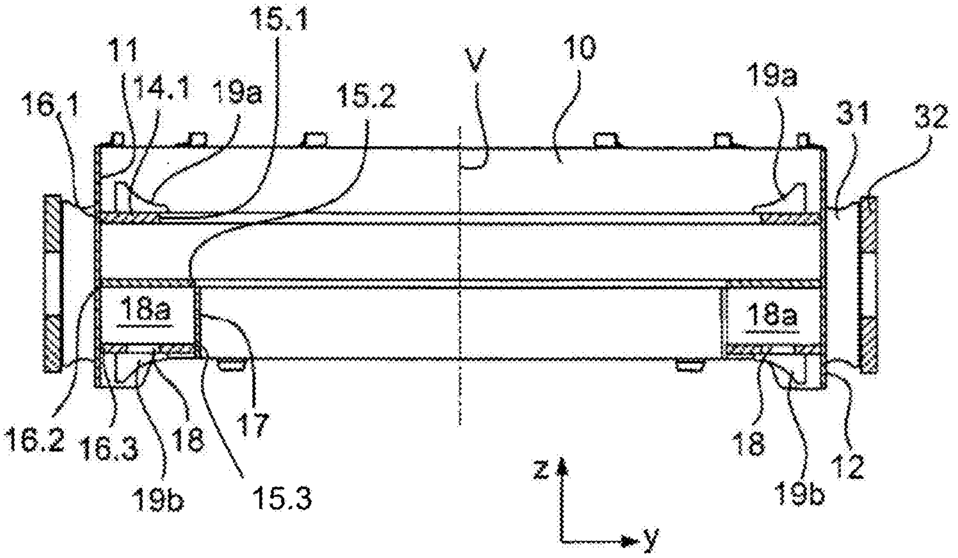
FIG. 5 is a sectional view of the structure shown in FIG. 3.

As shown in FIGS. 2, 4 and 5, the upper internal annular disk 14.2 of said two internal annular disks that are connected to the inner sleeve 17 and the inner sleeve 17 provide an unbroken surface, i.e., free of any openings, whereas the lower internal annular disk 14.3 is provided with openings 18 towards the outside environment, preferably facing downwardly. The two internal annular disks 14.2 and 14.3, the screen carrier frame 10 and the inner sleeve 17 form an annular channel **18*a* having a box-shaped cross-section, which, together with the single first internal annular disk 14.1 substantially increases the radial stiffness of the screen carrier frame 10**.

In some cases, however, the first internal annular disk 14.1 may be omitted. In some other cases, the first internal annular disk 14.1 may be replaced by a second circular channel **18*a*** having a box-shaped cross section, resulting in total in four internal annular disks.

The openings 18 are sufficiently large for the purpose of cleaning and disinfection so that breeding of germs in the circular channel **18*a* can be prevented by flushing the circular channel 18*a*** with cleaning detergents and/or disinfectants.

Optionally, a plurality of webs **19*a*, 19*b* may be provided between the screen carrier frame 10 and the internal annular disks 14.1, 14.2, and 14.3. The webs 19*a*, 19*b* may extend inwardly from the inner circumference 11 of the screen carrier frame 10 and perpendicularly to the internal annular disks 14.1, 14.2, and 14.3. In particular, the webs 19*a*, 19*b* may be connected, e.g. welded, to the inner circumference 11 of the screen carrier frame 10 and at least one of said internal annular disks 14.1, 14.2, and 14.3**.

In the embodiment shown in the drawings, upper webs **19*a* are provided at an upper side of the uppermost, i.e. first internal annular disk 14.1 and lower webs 19*b* are provided at a bottom side of the lowermost third internal annular disk 14.3**.

At least two of said webs **19*a*, 19*b* may be arranged in parallel to each other at the inner circumference 11 opposite to one vibration motor 30 on the outer circumference 12 to thereby further increase the radial stiffness of the screen carrier frame 10 in the direction of the radial forces generated by the two vibration motors 30**.

The output hopper 50 is inserted vertically from the top into screen carrier frame 10 and clamped between the screen 20 and the upper rim 13 of the screen carrier frame 10. The output hopper 50 collects any material that passes through the screen 20 and may have an output opening 51 for attaching e.g. a bag, container or the like. The output opening 51 may also lead towards an output conveyor.

It is noted that the diameter of the inner rim 15.1 of the uppermost of said first, second and third internal annular disks is larger than the diameter of the inner rim 15.2, 15.3 of the two further internal annular disks 14.2, 14.3. The inner rims 15.1, 15.2 and 15.3 of the internal annular disks 14.1, 14.2, and 14.3 are clear off the outer walls of the output hopper 50.

The hood 40 sealingly covers the screen carrier frame 10 and screen 20. It is provided with an inlet opening 41 for product to be screened and has at least one radial outlet 42 for solid materials that are too large to pass through the screen.

The screen 20 is clamped between the upper rim 13 of the screen carrier frame 20 and a lower rim 43 of the hood 40 by the clamping means 60.

In a preferred embodiment, the output hopper 50, the screen 20 and the hood 40, are subsequently stacked on the upper rim 13 of the screen carrier frame 10 and are all together secured by the clamping means 60, which are configured to pull the hood 40 against the screen carrier frame 10.

The vibratory screener 1 rests on a spring assembly 70 vertically supporting the screen carrier frame 10.

In one particular embodiment, the vibratory screener 1 comprises a screen carrier frame 10 having an inner circumference 11 and an outer circumference 12, a screen 20 for separation of solid particles extending horizontally within the screen carrier frame 10 and being vertically supported by the screen carrier frame 10, one or more vibration motors 30 arranged on the outer circumference 12 of the screen carrier frame 10 and configured to generate a component of vibration in a direction z perpendicular to the screen 20 and a component of vibration in a radial direction xy of the screen 20, at two internal annular disks 14.2, 14.3 each having an inner rim 15.2, 15.3 and an outer rim 16.2, 16.3, wherein each internal annular disks 14.2, 14.3 is attached to the inner circumference 11 of the screen carrier frame 10 by its outer rim 16.2, 16.3, and wherein these two internal annular disks 14.2, 14.3 are spaced apart from each other in parallel planes, and an inner sleeve 17 arranged within the sleeve carrier frame 10 and attached to the inner rims 15.2, 15.3 of said internal annular disks 14.2, 14.3, wherein the upper one of the internal annular disks 14.2, 14.3 and the inner sleeve 17 provide an unbroken surface, free of any openings, whereas the lower internal annular disk 14.3 is provided with openings 18 towards the outside environment, thereby defining, together with the screen carrier frame 10, an annular channel **18*a* that is open at said openings 18. Optionally, this particular embodiment may be modified further by features already illustrated above, e.g. by adding another internal annular disk 14.1 or varying the number of vibration motors 30**.

The vibratory screener 1 of the embodiments is able to meet highest hygienic safety standards with regard to pharmaceuticals and food processing. In particular, the apparatus 1 and its parts can be cleaned and disinfected without raising biological hazards. All surfaces can be reliably reached by cleaning detergents and disinfectants. Secluded hollow spaces with access only via capillary cracks or the like, in which germs may breed practically undisturbed, are avoided completely.

In addition, by using vibration motors 30 on the outer circumference 12 of the screen carrier frame 10, the risk of contamination by lubricants is minimized.

Because of the lightweight construction of the reinforced screen carrier frame 10, relatively small vibration motors 30 may be used.

Radial forces are readily absorbed by the high radial stiffness of the reinforced screen carrier frame 10 so that large diameters of 800 mm and more for high throughputs will be possible.

The invention thus provides an elegantly simple solution to a complex technical problem.

The invention has been described in detail with reference to an exemplary embodiment and further modifications. However, the invention is not limited thereto but comprises all embodiments defined by the claims. In particular, technical features can be combined with one another even if not explicitly described above, as long as this is technically possible. The exemplary embodiment is intended to illustrate all aspects of the invention merely for the purpose of completeness of disclosure and for enhancing understanding. This, however, does not imply that all feature described in combination must in fact be combined with each other. To the contrary, it is hereby explicitly stated that it is intended to encompass all technical possible sub-combinations and permutations of features in the present disclosure the detailed recitation thereof is omitted only for the reasons of conciseness.

What is claimed is:

1. A vibratory screener (1), comprising:

a screen carrier frame (10) having an inner circumference (11) and an outer circumference (12), a screen (20) for separation of solid particles extending horizontally within the screen carrier frame (10) and being vertically supported by the screen carrier frame (10), one or more vibration motors (30) mounted on the outer circumference (12) of the screen carrier frame (10) and configured to generate a component of vibration in a direction (z) perpendicular to the screen (20), at least two internal annular disks (14.1, 14.2, 14.3) each having an inner rim (15.1, 15.2, 15.3) and an outer rim (16.1, 16.2, 16.3), wherein each of said at least two internal annular disks (14.1, 14.2, 14.3) is attached to the inner circumference (11) of the screen carrier frame (10) by its outer rim (16.1, 16.2, 16.3), and wherein said at least two internal annular disks (14.1, 14.2, 14.3) are spaced apart from each other in parallel planes, and an inner sleeve (17) arranged within the screen carrier frame (10) and connected to the inner rims (15.2, 15.3) of two (14.2, 14.3) of said at least two internal annular disks, wherein the upper internal annular disk (14.2) of said two internal annular disks and the inner sleeve (17) provide an unbroken surface whereas the lower internal annular disk (14.3) of said two internal annular disks is provided with openings (18) towards the outside environment.

2. The vibratory screener (1) of claim 1, wherein the screen carrier frame (10) has a cylindrical shape.

3. The vibratory screener (1) of claim 1, wherein the diameter of the outer circumference (12) of the screen carrier frame (10) is larger than 800 mm.

4. The vibratory screener (1) of claim 1, wherein the outer rims (16.1, 16.2, 16.3) of the at least two internal annular disks (14.1, 14.2, 14.3) are welded to the inner circumference (11) of the screen carrier frame (10).

5. The vibratory screener (1) of claim 1, wherein the inner sleeve (17) is welded to the inner rims (15.2, 15.3) of said two internal annular disks (14.2, 14.3).

6. The vibratory screener (1) of claim 1, wherein said at least two internal annular disks include a first, second and third internal annular disk (14.1, 14.2, 14.3), wherein the diameter of the inner rim (15.1) of the uppermost (14.1) of said first, second and third internal annular disks is larger than the diameter of the inner rim (15.2, 15.3) of the two further internal annular disks (14.2, 14.3).

7. The vibratory screener (1) of claim 1 further comprising a plurality of webs (**19*a*, 19*b*) extending inwardly from the inner circumference (11) of the screen carrier frame (10) and perpendicularly to the at least two internal annular disks (14.1, 14.2, 14.3), said webs (19*a*, 19*b*) being connected to the inner circumference (11) of the screen carrier frame (10) and at least one of said internal annular disks (14.1, 14.2, 14.3**).

8. The vibratory screener (1) of claim 7, wherein at least two of said webs (**19*a*, 19*b*) are arranged in parallel to each other at the inner circumference (11) opposite to one vibration motor (30) on the outer circumference (12**).

9. The vibratory screener (1) of claim 1, wherein at least two vibration motors are provided and each vibration motor (30) has an axis of rotation (A) running in a tangent plane of the outer circumference (12) of the screen carrier frame (10), the tangent planes of the vibration motors (30) being parallel to each other.

10. The vibratory screener (1) of claim 9, wherein the axes of rotation (A) in the tangent planes are symmetrically inclined with respect to a vertical axis (V) of the vibratory screener (1).

11. The vibratory screener (1) of claim 1, wherein at least two vibration motors are provided and the vibration motors (30) are attached to the outer circumference (12) of the screen carrier frame (10) by brackets (31), which are secured to the outer circumference (12) of the screen carrier frame (10).

12. The vibratory screener (1) of claim 1 further comprising a spring assembly (70) vertically supporting the screen carrier frame (10).

13. The vibratory screener (1) of claim 1 further comprising a hood (40) sealingly covering the screen carrier frame (10), wherein the screen (20) is clamped between an upper rim (13) of the screen carrier frame (10) and a lower rim (43) of the hood (40) by clamping means (60).

14. The vibratory screener (1) of claim 1 further comprising an output hopper (50) clamped between the screen (20) and the upper rim (13) of the screen carrier frame (10).

15. The vibratory screener (1) of claim 1, wherein two vibration motors (30) are arranged opposite each other at the outer circumference (12) of the screen carrier frame (10).

16. A vibratory screener (1), comprising a screen carrier frame (10) having an inner circumference (11) and an outer circumference (12), a screen (20) for separation of solid particles extending horizontally within the screen carrier frame (10) and being vertically supported by the screen carrier frame (10), one or more vibration motors (30) arranged on the outer circumference (12) of the screen carrier frame (10) and configured to generate a component of vibration in a direction (z) perpendicular to the screen (20), at least two internal annular disks (14.1, 14.2, 14.3) each having an inner rim (15.1, 15.2, 15.3) and an outer rim (16.1, 16.2, 16.3), wherein each of said at least two internal annular disks (14.1, 14.2, 14.3) is attached to the inner circumference (11) of the screen carrier frame (10) by its outer rim (16.1, 16.2, 16.3), and wherein said at least two internal annular disks (14.1, 14.2, 14.3) are spaced apart from each other in parallel planes, and an inner sleeve (17) arranged within the sleeve carrier frame (10) and attached to the inner rims (15.2, 15.3) of two (14.2, 14.3) of said at least two internal annular disks, wherein the upper internal annular disk (14.2) of said two internal annular disks and the inner sleeve (17) provide an unbroken surface whereas the lower internal annular disk (14.3) of said two internal annular disks is provided with openings (18) towards the outside environment;

wherein the outer rims (16.1, 16.2, 16.3) of the at least two internal annular disks (14.1, 14.2, 14.3) are welded to the inner circumference (11) of the screen carrier frame (10); and wherein the inner sleeve (17) is welded to the inner rims (15.2, 15.3) of said two internal annular disks (14.2, 14.3).

17. The vibratory screener (1) of claim 16, wherein said at least two internal annular disks include a first, second and third internal annular disk (14.1, 14.2, 14.3), wherein the diameter of the inner rim (15.1) of the uppermost (14.1) of said first, second and third internal annular disks is larger than the diameter of the inner rim (15.2, 15.3) of the two further internal annular disks (14.2, 14.3).

18. The vibratory screener (1) of claim 16, wherein a plurality of webs (**19*a*, 19*b*) extend inwardly from the inner circumference (11) of the screen carrier frame (10) and perpendicularly to the at least two internal annular disks (14.1, 14.2, 14.3), said webs (19*a*, 19*b*) being connected to the inner circumference (11) of the screen carrier frame (10) and at least one of said internal annular disks (14.1, 14.2, 14.3**).

19. The vibratory screener (1) of claim 16, wherein at least two vibration motors are provided and each vibration motor (30) has an axis of rotation (A) running in a tangent plane of the outer circumference (12) of the screen carrier frame (10), the tangent planes of the vibration motors (30) being parallel to each other;

wherein the vibration motors (30) are attached to the outer circumference (12) of the screen carrier frame (10) by brackets (31), which are secured to the outer circumference (12) of the screen carrier frame (10); and wherein a spring assembly (70) vertically supports the screen carrier frame (10).

20. The vibratory screener (1) of claim 16, wherein a hood (40) sealingly covers the screen carrier frame (10);

wherein the screen (20) is clamped between an upper rim (13) of the screen carrier frame (10) and a lower rim (43) of the hood (40) by clamping means (60); and wherein an output hopper (50) is clamped between the screen (20) and the upper rim (13) of the screen carrier frame (10).

* * * * *